United States Patent
Ni (10) Patent No.: US 10,055,731 B2
(45) Date of Patent: Aug. 21, 2018

(54) METHOD AND DEVICE FOR SECURING AN INFORMATION INTERACTION PROCESS

(71) Applicant: Tencent Technology (Shenzhen) Company Limited, Shenzhen (CN)

(72) Inventor: Yihan Ni, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 1315 days.

(21) Appl. No.: 14/081,985

(22) Filed: Nov. 15, 2013

(65) Prior Publication Data

US 2014/0074716 A1 Mar. 13, 2014

Related U.S. Application Data

(63) Continuation of application No. PCT/CN2013/081058, filed on Aug. 8, 2013.

(30) Foreign Application Priority Data

Aug. 15, 2012 (CN) .......................... 2012 1 0290552

(51) Int. Cl.
*G06Q 20/40* (2012.01)
*G06F 21/51* (2013.01)
*G06F 21/60* (2013.01)

(52) U.S. Cl.
CPC ........... *G06Q 20/401* (2013.01); *G06F 21/51* (2013.01); *G06F 21/606* (2013.01); *G06F 2221/2119* (2013.01)

(58) Field of Classification Search
CPC ...... G06F 21/51; G06F 21/606; G06Q 20/401
See application file for complete search history.

(56) References Cited

U.S. PATENT DOCUMENTS

| 6,378,075 B1 * | 4/2002 | Goldstein | A63F 13/12 705/64 |
| 2002/0111919 A1 * | 8/2002 | Weller | G06Q 20/02 705/67 |

(Continued)

FOREIGN PATENT DOCUMENTS

| CN | 101022339 A | 8/2007 |
| CN | 101378395 A | 3/2009 |

(Continued)

OTHER PUBLICATIONS

Tencent Technology, ISRWO, PCT/CN2013/081058, dated Nov. 14, 2013, 8 pgs.

(Continued)

*Primary Examiner* — Saleh Najjar
*Assistant Examiner* — Louis C Teng
(74) *Attorney, Agent, or Firm* — Morgan, Lewis & Bockius LLP (57) ABSTRACT

An electronic device with one or more processors, memory, and a display detects a user interaction with a user interface of a first application and, in response to detecting the user interaction with the user interface of the first application, determines whether one or more security parameters are satisfied, where a first security parameter is satisfied when a network access point being used by the electronic device satisfies predefined criteria. In accordance with a determination that the one or more security parameters are satisfied, the device: displays a security keyboard on the display corresponding to a second application different from the first application; and receives user information input via the security keyboard by a user of the electronic device. The device transmits the user information to a target terminal.

11 Claims, 8 Drawing Sheets (56) References Cited

U.S. PATENT DOCUMENTS

| | | | |
|---|---|---|---|
| 2004/0039924 A1* | 2/2004 | Baldwin | G06F 21/53 |
| | | | 713/189 |
| 2008/0010190 A1* | 1/2008 | Rackley, III | G06Q 20/042 |
| | | | 705/39 |
| 2008/0065648 A1* | 3/2008 | Gupta | G06F 17/30575 |
| 2008/0215883 A1* | 9/2008 | Fok | H04L 63/0869 |
| | | | 713/167 |
| 2011/0072259 A1* | 3/2011 | Madani | G06F 21/36 |
| | | | 713/150 |
| 2012/0233665 A1* | 9/2012 | Ranganathan | G06F 21/33 |
| | | | 726/4 |
| 2015/0052005 A1* | 2/2015 | Howe | G06Q 20/40 |
| | | | 705/26.8 |

FOREIGN PATENT DOCUMENTS

| | | |
|---|---|---|
| CN | 101610320 A | 12/2009 |
| CN | 101651973 A | 2/2010 |
| CN | 102148831 A | 8/2011 |
| CN | 102843681 A | 12/2012 |
| WO | WO 2009158420 A1 | 12/2009 |

OTHER PUBLICATIONS

Tencent Technology, IPRP, PCT/CN2013/081058, dated Feb. 17, 2015, 6 pgs.

* cited by examiner

METHOD AND DEVICE FOR SECURING AN INFORMATION INTERACTION PROCESS

RELATED APPLICATIONS

This application is a continuation application of PCT Patent Application No. PCT/CN2013/081058, entitled "METHOD AND DEVICE FOR SECURING AN INFORMATION INTERACTION PROCESS" filed on Aug. 8, 2013, which claims priority to Chinese Patent Application No. 201210290552.1, entitled "METHOD AND APPARATUS FOR INFORMATION EXCHANGES," filed on Aug. 15, 2012, both of which are incorporated by reference in their entirety.

TECHNICAL FIELD

The present invention relates to the technical field of computer security and, more particularly, to a method and device for securing an information interaction process or the transmission of private user information.

BACKGROUND

Mobile payment allows a user to pay for goods or services using a mobile terminal (e.g., a mobile phone or other portable electronic device). After physical credit card and online payment methods, mobile payment has become a preferred new payment method. With the development of mobile terminals and mobile e-commerce, more users are paying for services via their mobile terminals. However, mobile payment involves the interaction and/or transmission of private user information and property. Thus, security problems such as attacks from malicious software leading to the leak and/or loss of private user information and property are a prime concern.

SUMMARY OF THE INVENTION

In order to solve the problems in the prior art, the embodiments of the present invention provide a method and device for securing an information interaction process. The method is performed at an electronic device (e.g., a mobile terminal or client device) with one or more processors, memory, and a display. The method includes: detecting a user interaction with a user interface for a first application (e.g., associated with an information interaction process, such as an online payment platform or a payment application); and in response to detecting the user interaction with the user interface for the first application, determining whether one or more security parameters are satisfied, where a first security parameter is satisfied when a network access point being used by the electronic device satisfies predefined criteria. The method also includes, in accordance with a determination that the one or more security parameters are satisfied: displaying a security keyboard on the display corresponding to a second application different from the first application; and receiving user information input via the security keyboard by a user of the electronic device. The method further includes transmitting the user information to a target terminal (e.g., a server associated with the first application).

In some embodiments, an electronic device or computer system (e.g., a client device/mobile terminal or server system) includes: one or more processors; memory; a display; and one or more programs, where the one or more programs are stored in the memory and configured to be executed by the one or more processors, the one or more programs include instructions that when executed by the one or more processors cause the device or system to perform the operations of any of the methods described herein. In some embodiments, a non-transitory computer readable storage medium stores one or more programs, the one or more programs comprising instructions, which, when executed by an electronic device or computer system with one or more processors and a display (e.g., a client device/mobile terminal or server system), cause the device or system to perform the operations of any of the methods described herein.

BRIEF DESCRIPTION OF DRAWINGS

The embodiments disclosed herein are illustrated by way of example, and not by way of limitation, in the figures of the accompanying drawings. Like reference numerals refer to corresponding parts throughout the drawings.

DETAILED DESCRIPTION

In order to make the objects, technical solution and advantages of the present invention more clear, the embodiments of the present invention will be further described in detail in conjunction with the accompanying drawings.

Figure 1:
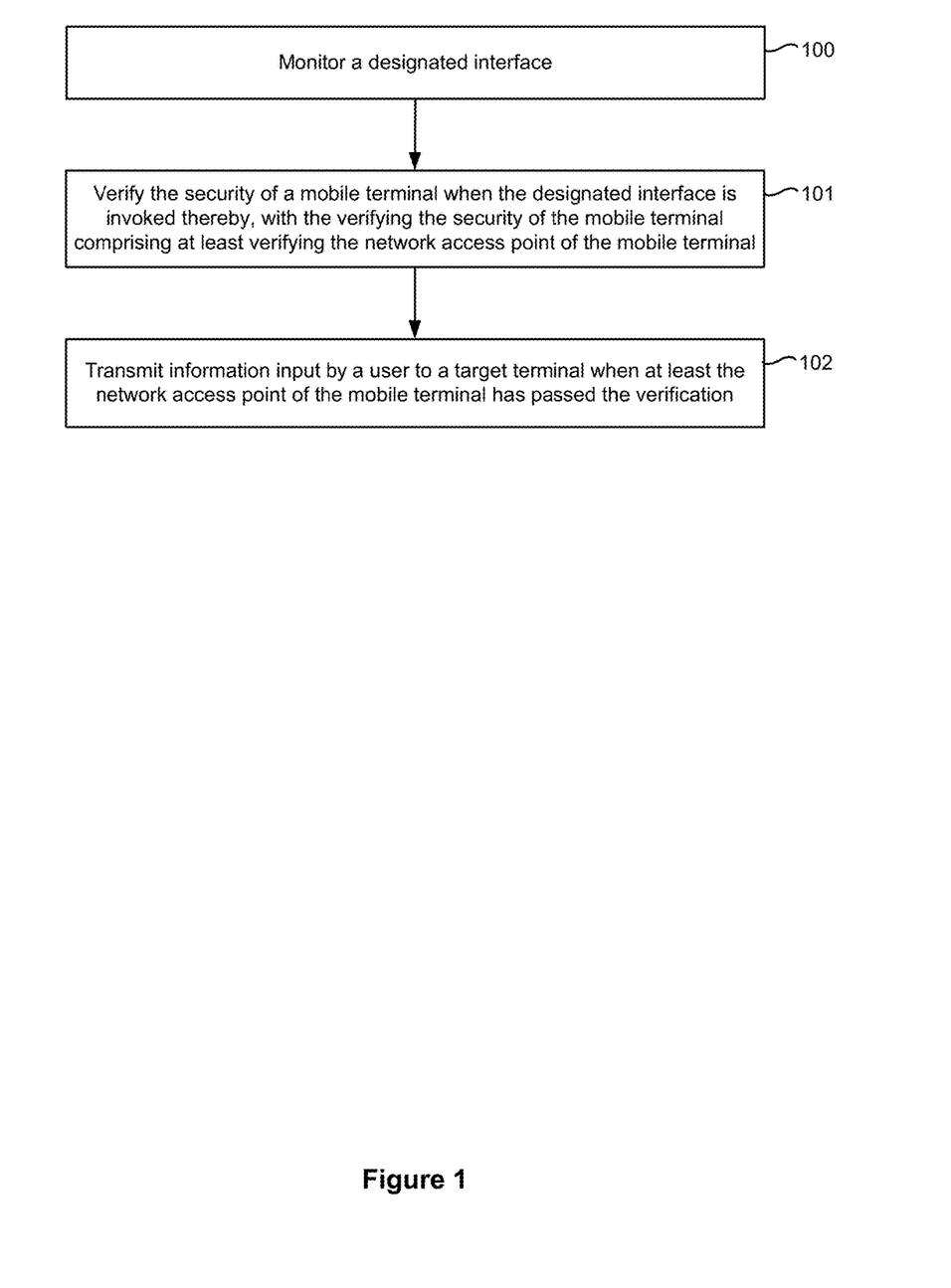
FIG. 1 is a flowchart of a method of information interaction in accordance with some embodiments.

FIG. 1 is a flowchart of a method of information interaction in accordance with some embodiments. The information interaction refers to the exchange or transmission of private user information during mobile payment performed at a mobile terminal (e.g., client device 502/503, FIGS. 5-6).

The mobile terminal monitors (100) a designated interface. In one embodiment, monitoring the designated interface includes monitoring an interface of a first designated application program (e.g., first application 630, FIG. 6) for information interaction. The interface of the first designated application program is monitored, and when it is determined that the interface of the first designated application program is invoked, the mobile terminal enters an information interaction process (e.g., the first application program is a mobile payment program). The source of the first designated application program is not restricted in the present invention. For example, the first designated application program is an online payment platform embedded in a web site for a seller or merchant, or the first designated application program is a payment application downloaded by the user of the mobile terminal.

In another embodiment, monitoring the designated interface includes monitoring an interface of a browser and a web page opened by the browser for information interaction performed via a web page. When the interface of the browser is invoked by a mobile terminal and the browser opens a designated web page, the mobile terminal enters an information interaction process. When the address of the opened web page is an address for information interaction, such as the address of an online payment platform or the like, the mobile terminal enters an information interaction process.

Figure 6:
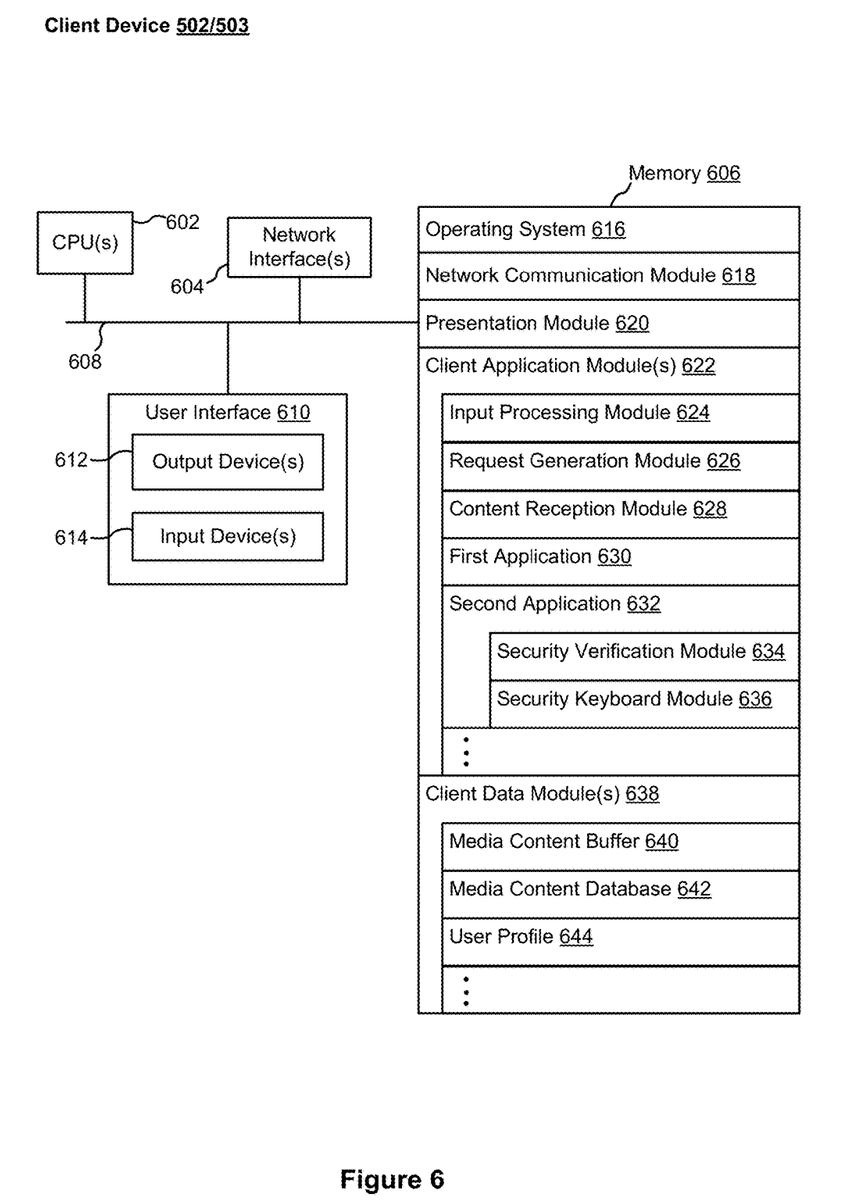
FIG. 6 is a diagram of an example of a client device in accordance with some embodiments.

The mobile terminal verifies (101) the security of the mobile terminal when the designated interface is invoked thereby (e.g., verification of the security of the mobile terminal is performed by security verification module 634, FIG. 6). Verifying the security of the mobile terminal at least comprises verifying the network access point of the mobile terminal. In one embodiment, verifying the network access point of the mobile terminal includes ensuring that the mobile terminal accesses a secure network access point. In some embodiments, a user can restrict the network access points of the mobile terminal, and perform information interaction only when the network access point is a known access point. Therefore, the mobile terminal determines whether the current access point is a designated network access point according to a locally stored list of designated (or preferred) network access points. If the current access point is a designated access point, the network access point of the mobile terminal passes the verification, and if not, the network access point of the mobile terminal does not pass the verification.

In another embodiment, verifying the network access point of the mobile terminal includes determining if the type of the network access point is a mobile network (e.g., cmwap, uniwap, etc.), and/or whether a proxy server thereof is correct. If yes, the network access point of the mobile terminal passes the verification, and if not, the network access point of the mobile terminal does not pass the verification. However, if the type of the network access point is a wireless network (e.g., cmnet, uninet, etc.) or WiFi, verifying the network access point of the mobile terminal includes determining whether port 443 is being used. In other words, the mobile terminal determines whether the network access point uses HyperText Transfer Protocol Secure (e.g., HTTPS). If yes, the network access point of the mobile terminal passes the verification, and if not, the network access point of the mobile terminal does not pass the verification.

The mobile terminal transmits (102) information input by a user to a target terminal (e.g., server system 510, FIGS. 5 and 7 associated with a seller or merchant) when at least the network access point of the mobile terminal has passed the verification.

When the mobile terminal enters the information interaction process and the network access point has passed the verification, it is considered by default that the information interaction can be carried on to its end (e.g., transmission of the user information to the target terminal). Also, information input by the user is then sent to the target terminal according to the address of the target terminal (e.g., associated with a seller or merchant in the information interaction process).

When the network access point of the mobile terminal does not pass the verification, the user should be notified that safety hazards exist in the information interaction. For example, the user is notified that the network access point of the mobile terminal does not pass the verification, and, subsequently, whether the information interaction should be carried on is determined by the user's choice. In some embodiments, when an instruction is received from the user determines to carry on the information interaction despite notification of the safety hazards, the information interaction is carried on. However, if an instruction is received from the user to discontinue the information interaction, the information interaction is discontinued.

In some embodiments, a method of information interaction comprises: monitoring a designated interface; verifying the security of a mobile terminal when the designated interface is invoked thereby, with the verifying the security of the mobile terminal comprising at least verifying the network access point of the mobile terminal; and transmitting information input by a user to a target terminal when at least the network access point of the mobile terminal has passed the verification. The technical solution provided in the present invention, by verifying at least the network access point for information interaction, improves the security of the network access point, avoids security problems such as attacks from malicious software during the information interaction for mobile payments and so on, and avoids leak and/or loss of user information and property.

In some embodiments, verifying the security of the mobile terminal in step 101 further comprises the following steps 101*a* and/or 101*b* (e.g., the additional verification steps are also performed by security verification module 634, FIG. 6).

In some embodiments, the mobile terminals verifies (101*a*) the application signature of a first designated application program when an interface of the first designated application program is invoked. When the information interaction is performed via a first designated application program, verification needs to be performed on the application signature of the first designated application signature to ensure that the first designated application program is a valid application instead of malicious software. The method for information interaction can only be carried on until the end of the information interaction (e.g., transmission of the user information to the target terminal) when the application signature of the first designated application has passed the verification. Also, the user is notified of the existence of the safety hazards in the information interaction when the application signature of the first designated application program does not pass the verification.

In some embodiments, the mobile terminal verifies (101*b*) the URL and/or page information of a designated web page when an interface of a browser is invoked and the browser opens the designated web page. However, when the information interaction is performed via the designated web page opened by the browser, verification needs to be performed on the designated web page, with the verification comprising verification of the URL and/or page information of the designated web page. In some embodiments, verification of the URL of the designated web page comprises determining whether the URL is the same as a destination URL to be turned to, and if yes, the verification is passed, and if not, the verification is not passed. In some embodiments, verification of the page information comprises determining whether the amount of money to be paid is the same as the amount indicated in the page information, and if yes, the verification is passed, and if not, the verification is not passed. When the URL and/or page information of the designated web page have passed the verification, the information interaction is carried on until the end of the information interaction (e.g., transmission of the user information to the target terminal). If the URL and/or page information of the designated web page do not pass the verification, the user is notified of the existence of the safety hazards in the information interaction.

In some embodiments, verifying the application signature of the first designated application program in step 101*a*, optionally, comprises comparing the application signature of the first designated application program with a locally stored official application signature of the first application program. If the application signature of the first designated application program is the same as the locally stored official application signature of the first designated application program, the application signature of the first designated application program passes the verification. However, if the application signature of the first designated application program is not the same as the locally stored official application signature of the first designated application program, the application signature of the first designated application program does not pass the verification. It is noted that, in order to ensure the security of the first designated application program, an official application signature of the first designated application program can be stored when a mobile payment client is installed, and the official application signature can be locally read from the mobile terminal when information interaction for mobile payment is performed, and the application signature of the first designated application program can be compared with the locally stored official application signature of the first application program to ensure that the first designated application program is not switched.

In some embodiments, verifying the URL and page information of the designated web page in step 101b, optionally, comprises checking, by way of domain name resolution, whether or not any of URL and page information of the designated web page has been tampered with, and if yes, the URL and page information of the designated web page do not pass the verification, and if not, the URL and page information of the designated web page pass the verification.

In some embodiments, verifying the security of the mobile terminal in step 101, optionally, further comprises initiating (e.g., displaying) a security keyboard for a second designated application program, and receiving the information via the security keyboard (e.g., performed by security keyboard module 636, FIG. 6). When the user needs to input information for payment, the security keyboard for the second designated application program is initiated to prevent the information input by the user from being eavesdropped on by malicious software and prevent the payment information of the user from being recorded and/or leaked thereby, so that the user inputs payment information via the security keyboard and the mobile terminal receives the information input via the security keyboard. In some embodiments, initiating the security keyboard for the second designated application program comprises invoking an interface of the security keyboard for the second designated application program to initiate the security keyboard. The second designated application program can be a third-party application program that does not come with the mobile terminal system and is installed by the mobile terminal, which is not restricted in the present invention. Therefore, when the user needs to input information during information interaction, the security keyboard is initiated to receive the payment information input by the user, thus preventing malicious software from intercepting, recording, and/or leaking the information input by the user.

In some embodiments, after initiating a security keyboard for a second designated application program and receiving the information via the security keyboard, the method, optionally, further comprises verifying the address of the target terminal (e.g., performed by security verification module 634, FIG. 6). To further ensure the security of the information interaction process (e.g., mobile payment), the address of the target terminal (e.g., the seller or merchant) in the information interaction process is verified before information input by the user is transmitted to the target terminal.

Generally, for a first designated application program, the address of the target terminal thereof has been stored when installing the first designated application program; and when the information is received, the stored address of the target terminal is obtained and compared with the address of the target terminal which is kept in communication in the moment, and if they are consistent with each other, the verification is passed, and if they are not consistent with each other, the verification is not passed. However, for information interaction performed through a web page, whether the address of the target terminal for information interaction matches the domain name thereof is determined by way of domain name resolution, and if yes, the verification is passed, and if not, the verification is not passed. Therefore, the address of the target terminal is verified before the user information is transmitted to the target terminal, to prevent the leak and/or loss of user information caused by conditions like domain name hijacking and so on.

All the aforementioned optional technical solutions may be combined in any combinative method to constitute the optional technical solutions of the embodiments of the present invention; however, examples will not be given one-by-one here.

Figure 2:
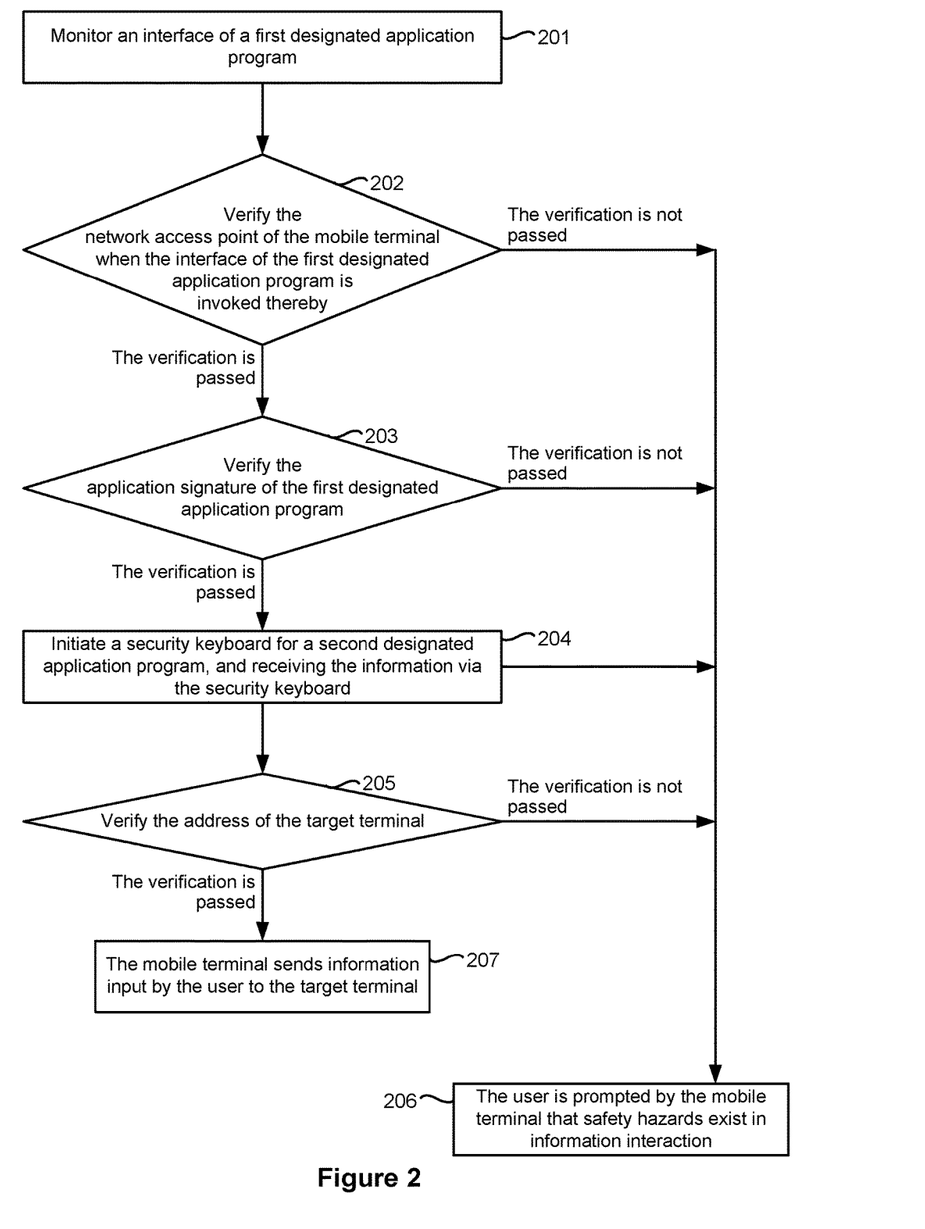
FIG. 2 is a flowchart of a method of information interaction in accordance with some embodiments.

FIG. 2 is a flowchart of a method of information interaction in accordance with some embodiments. In some embodiments, the method illustrated in FIG. 2 is performed at a mobile terminal with one or more processors, memory, and a display.

The mobile terminal monitors (201) an interface of a first designated application program (e.g., the monitoring is performed by input processing module 622, FIG. 6). In some embodiments, the monitoring comprises monitoring the interface of the first designated application program and an interface of a browser (e.g., first application 630, FIG. 6).

The mobile terminal verifies (202) the network access point of the mobile terminal when the interface of the first designated application program is invoked thereby (e.g., verification of the network access point is performed by security verification module 634, FIG. 6). If the network access point of the mobile terminal has passed the verification, step 203 is carried out. However, if the network access point of the mobile terminal does not pass the verification, step 206 is carried out.

The mobile terminal verifies (203) the application signature of the first designated application program (e.g., verification of the application signature of the first designated application program is performed by security verification module 634, FIG. 6). If the application signature of the first designated application program has passed the verification, step 204 is carried out. However, if the application signature of the first designated application program does not pass the verification, step 206 is carried out. In some embodiments, when the information interaction is performed via a designated web page, the URL and page information of the designated web page are also, optionally, verified (e.g., verification of the URL and page information is performed by security verification module 634, FIG. 6). If the URL and page information of the designated web page have passed the verification, step 204 is carried out. However, if the URL and/or page information of the designated web page do not pass the verification, step 206 is carried out.

The mobile terminal initiates (204) a security keyboard for a second designated application program and receives user information via the security keyboard (e.g., the security keyboard is initiated by security keyboard module 636, FIG. 6).

The mobile terminal verifies (205) the address of the target terminal (e.g., verification of address of the target terminal is performed by security verification module 634, FIG. 6). If the address of the address of the target terminal has passed the verification, step 207 is carried out. However, if the address of the target terminal does not pass the verification, step 206 is carried out.

The mobile terminal notifies (or prompts) (206) the user that safety hazards exist in the information interaction. In some embodiments, the prompt is in the form of a pop-up message or box overlaid on the user interface for the first designated application. Optionally, the mobile terminal notifies the user that safety hazards exist in the information interaction and, also, provides the user with options for discontinuing or continuing the information interaction.

The mobile terminal sends (207) information input by the user to the target terminal.

In some embodiments, a method of information interaction comprises: monitoring a designated interface; verifying the security of a mobile terminal when the designated interface is invoked thereby, with the verifying the security of the mobile terminal comprising at least verifying the network access point of the mobile terminal; and transmitting information input by a user to a target terminal when at least the network access point of the mobile terminal has passed the verification. The technical solution provided in the present invention, by verifying at least the network access point for information interaction, improves the security of the network point, avoids security problems such as attacks from malicious software during the information interaction for mobile payments and so on, and avoids leak and/or loss of user information and property. Furthermore, when the user needs to input information during information interaction, the security keyboard is initiated to receive the payment information input by the user, thus preventing malicious software from intercepting the information input by the user, and recording and/or leaking the user payment information. Furthermore, the address of the target terminal is verified before the information is transmitted to prevent leak and/or loss of the user information caused by conditions like domain name hijacking and so on.

Figure 3:
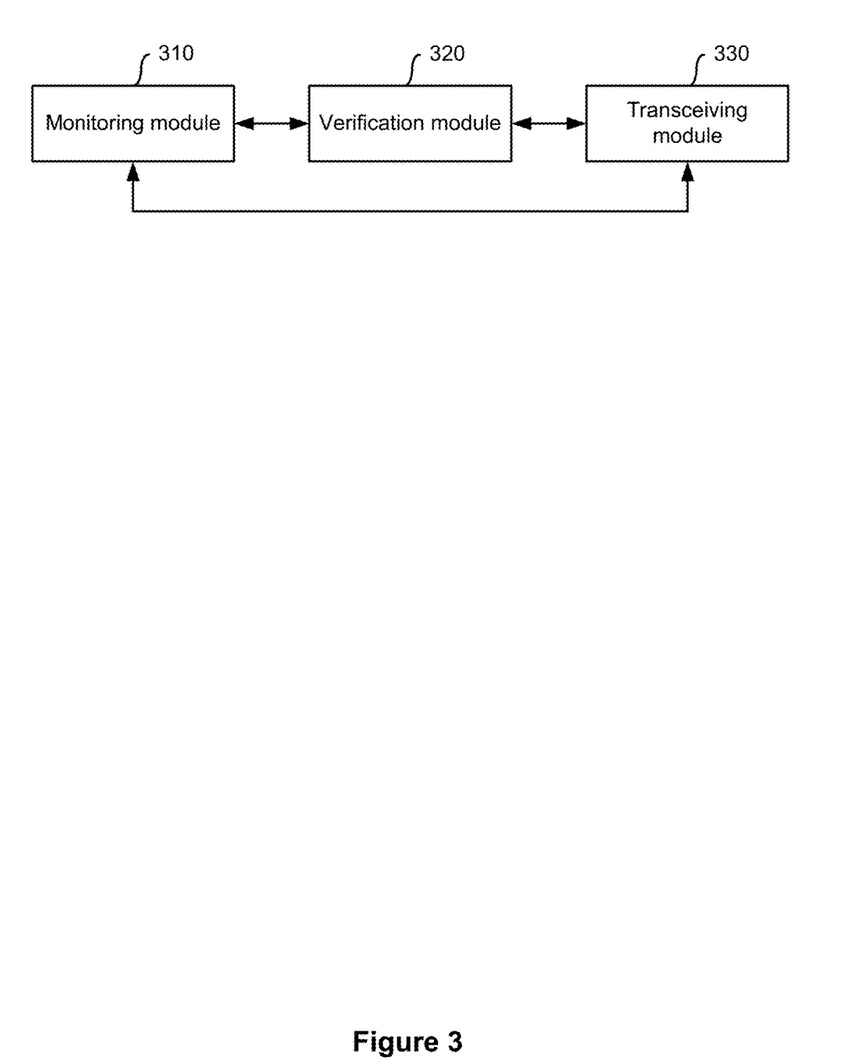
FIG. 3 is a structural schematic diagram of a device for information interaction in accordance with some embodiments.

FIG. 3 is a structural schematic diagram of a device for information interaction in accordance with some embodiments. Referring to FIG. 3, the device comprises: a monitoring module 310 configured to monitor a designated interface (e.g., input processing module 624, FIG. 6); a verification module 320 configured to verify the security of a mobile terminal when the designated interface is invoked (e.g., security verification module 634); and a transceiving module 330 for transmitting to a target terminal information input (e.g., network communication module 618) by a user when at least the network access point of the mobile terminal has passed the verification.

Verification module 320 is at least configured to verify the network access point of the mobile terminal. In some embodiments, verification module 320 is also configured to verify the application signature of a first designated application program when the interface of the first designated application program is invoked thereby. In some embodiments, verification module 320 is further configured to compare the application signature of the first designated application program with a locally stored official application signature of the first application program. If the application signature of the first designated application program is the same as the locally stored official application signature of the first designated application program, the application signature of the first designated application program has passed the verification.

In some embodiments, verification module 320 is further configured to verify the URL and/or page information of a designated web page when an interface of a browser is invoked thereby and the browser opens the designated web page. In some embodiments, verification module 320 is configured to determine, by way of domain name resolution, whether the URL and/or page information of the designated web page has been tampered with, and if not, the URL and page information of the designated web page pass the verification.

In some embodiments, transceiving module 330 is configured to initiate a security keyboard for a second designated application program, and receive user information input by the user of the mobile terminal via the security keyboard. In some embodiments, transceiving module 330 (or, alternatively, verification module 320) is also configured to verify the address of the target terminal.

It should be noted that when information interaction is performed on the device in the aforementioned embodiments, illustration is only made according to the division of the aforementioned functional modules, and in practical application, the aforementioned functions can be assigned to be completed by different functional modules as required (e.g., dividing the internal structure of the device into different functional modules to complete all or some of the functions described above). All details provided below are based at least in part on the aforementioned embodiments.

Figure 4A:
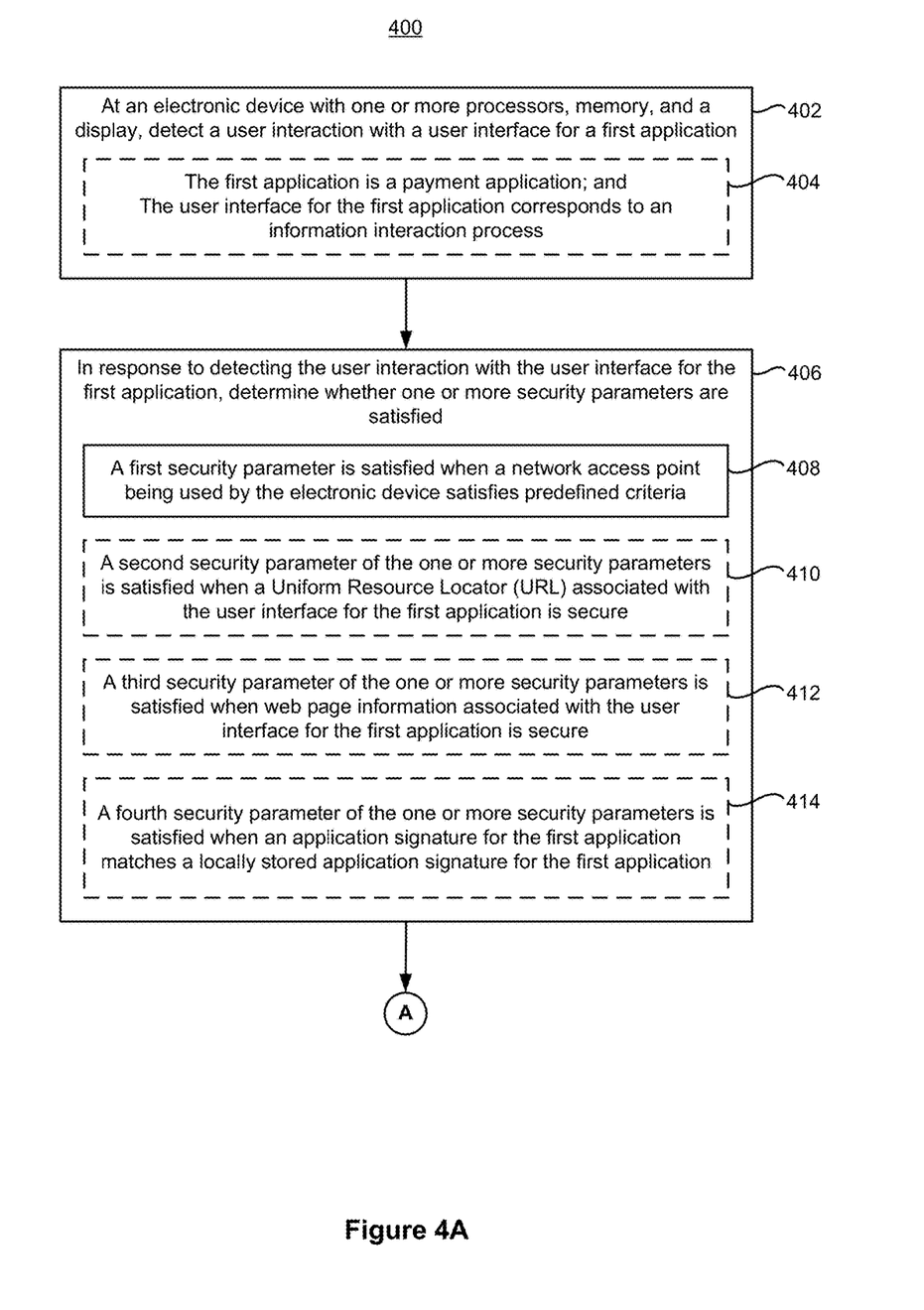
FIGS. 4A-4B illustrate a flow chart of a method of securing an information interaction process in accordance with some embodiments.
Figure 4B:
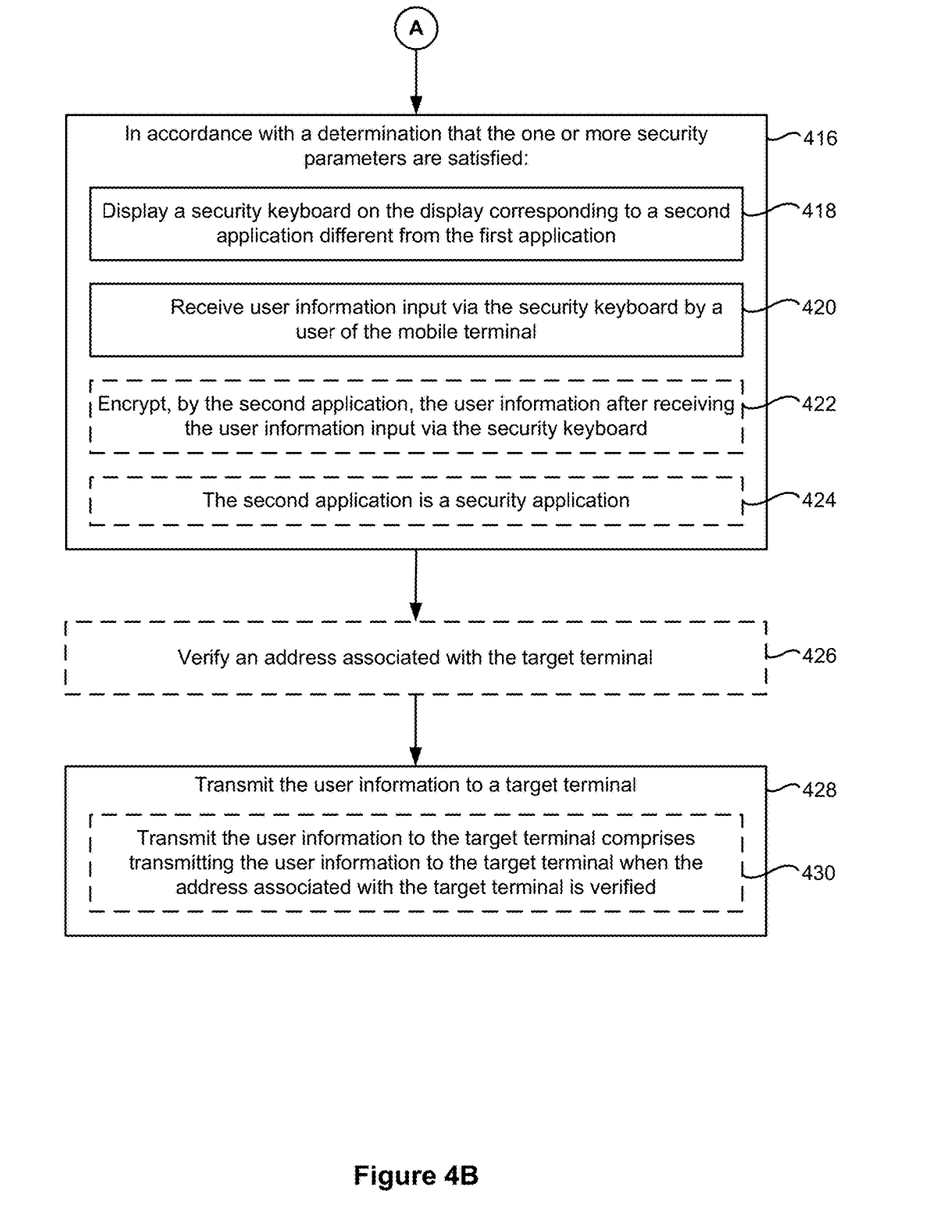
Figure 5:
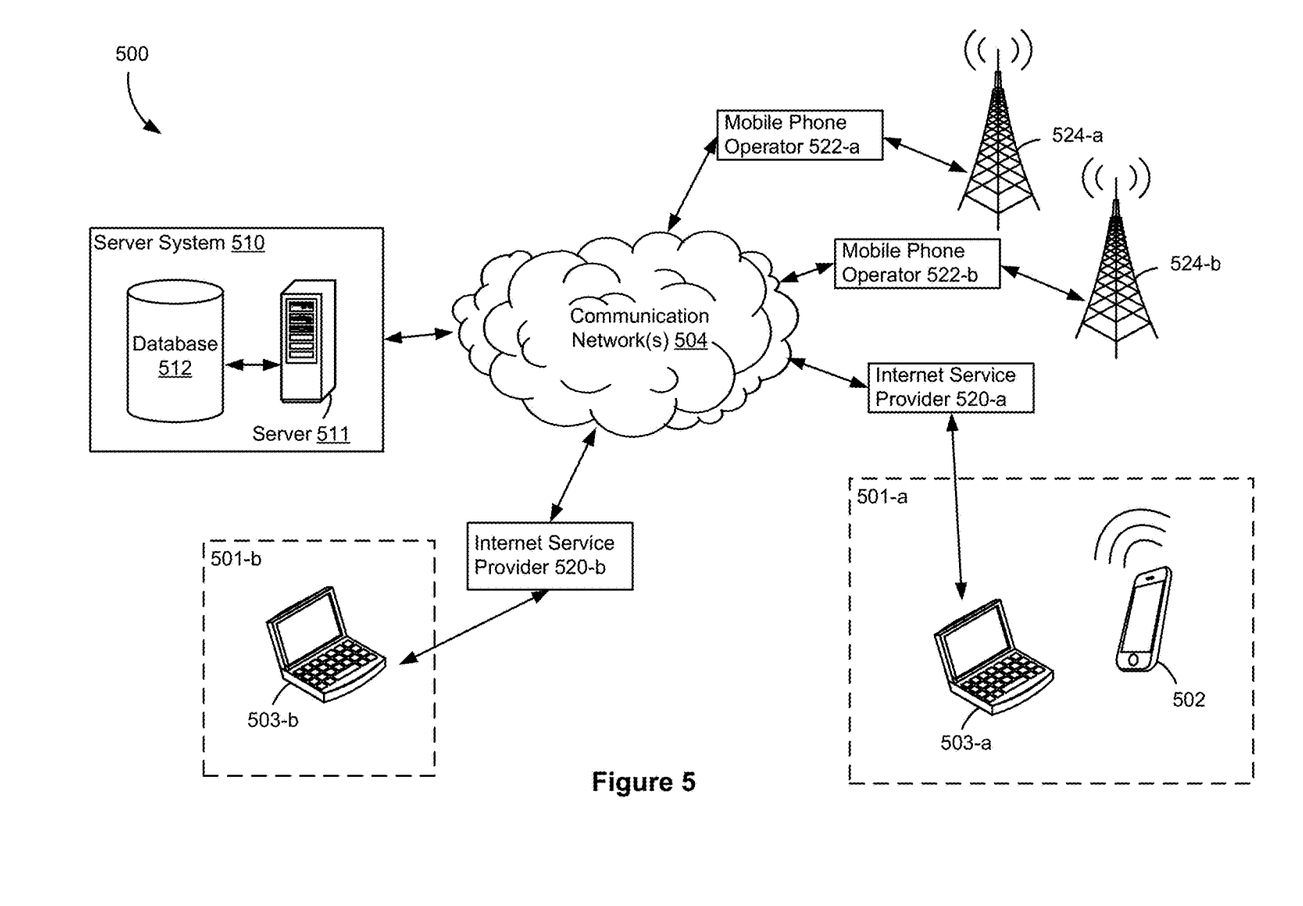
FIG. 5 is a diagram of a client-server environment in accordance with some embodiments.

FIGS. 4A-4B are flow diagrams illustrating a method 400 of securing an information interaction process in accordance with some embodiments. Method 400 is performed at an electronic device (e.g., client device 502/503 sometimes also herein called a mobile terminal, a client device or, more simply, a device) with one or more processors, memory, and a display. Some operations in method 400 are, optionally, combined, and/or the order of some operations is, optionally, changed.

The electronic device detects (402) a user interaction with a user interface for a first application (e.g., invoking an information interaction process). In some embodiments, the first application (e.g., first application 630) is an application that facilitates an information interaction process so that the user can efficiently and quickly complete a transaction or payment process. In some embodiments, the user interface is a shopping cart/checkout web page associated with a shopping web site being accessed in a web browser, or the user interface is another interface associated with the payment of goods or services. In some other embodiments, the user interface is a user interface for a standalone shopping or transaction-related application. For example, the user interaction includes a user input to begin the payment process (e.g., selecting a "checkout" affordance in a shopping website or a shopping application) or the selection of a field associated with private user information (e.g., credit card information, billing address, shipping address, etc.) in a user interface associated with completing a transaction.

In some embodiments, the first application is (404) a payment application, and the user interface for the first application corresponds to an information interaction process. In some embodiments, the first application is a payment application that facilitates a payment or transaction process (e.g., information interaction process). For example, the user interface is a payment interface associated the payment application that facilitates the entry and exchange of information (e.g., credit card information, billing address, shipping address, etc.) between the user of the device and a merchant (e.g., associated with the target terminal) for completing a transaction corresponding to an online purchase (e.g., the information interaction process).

In response to detecting the user interaction with the user interface for the first application, the electronic device determines (406) whether one or more security parameters are satisfied. The first application is invoked when device 502/503 (or, more specifically, input processing module 624) detects a user interaction with the user interface for the first application. For example, the first application is invoked when the user selects a field associated with private user information in the user interface for the first application, or the user selects/manipulates a user interface objects (e.g., a "checkout" affordance in a web page) in the user interface for the first application with a focus selector (e.g., a mouse icon), a keyboard, soft keyboard, fingers inputs on a touch screen display or touch-sensitive surface, or other input devices.

In some embodiments, security verification module 634 associated with a security second application (or another security application or device feature different from both the first and second applications) determines whether the one or more security parameters are satisfied. In some embodiments, the user of device 502/503 is enabled to manually add, remove, and/or modify security parameters for device 502/503 under a settings panel or, when device 502/503 is voice recognition enabled, the user is enabled to audibly request that device 502/503 change the security parameters. In some embodiments, device 502/503 determines whether all of the security parameters are satisfied. In some other embodiments, the device determines whether one or more security parameters of a plurality of security parameters designated by the user as high priority are satisfied.

In some embodiments, if device 502/503 (or, more specifically, security verification module 634) determines that one of the one or more security parameters is not satisfied, device 502/503 provides a notification or prompt (e.g., an audible or textual alert) informing the user of the device that the security of the transaction or information interaction is not verified and to proceed with caution. In some embodiments, the notification is pop-up message box that is overlaid on the user interface for the first application. In some embodiments, the notification provides the user with options to either proceed with the transaction or information interaction process despite the notification or discontinue the transaction or information interaction process.

A first security parameter of the one or more security parameters is satisfied (408) when a network access point being used by the device (or accessed by the device) satisfies predefined criteria. Device 502/503 (or, more specifically, security verification module 634) at least determines whether the predefined criteria associated with the first security parameter are satisfied. In some embodiments, the predefined criteria include the device being connected to a secure network access point (e.g., a password protected network). In some embodiments, the predefined criteria include the device being connected to one of one or more designated network access points (e.g., a specified home or workplace network, LAN, or WAN) or a specified type of network access point (e.g., WiFi, or a particular telecommunications protocol, such as EDGE, 3G, 4G LTE, and so on). In some embodiments, the predefined criteria include the device being connected to a network access point with a specified type of encryption (e.g., EAP, WEP, WPA, etc.) or specified type(s) of security feature(s). For example, the user has manually set security setting associated with the second application (e.g., a background security application) so that transactions or mobile/online payment only occurs when the device is connected to a WiFi network with WPA encryption.

In some embodiments, a second security parameter of the one or more security parameters is satisfied (410) when a Uniform Resource Locator (URL) associated with the user interface for the first application is secure. When the information interaction is performed via a web page (e.g., an online payment platform) opened by a browser, device 502/503 (or, more specifically, security verification module 634) determines whether the URL associated with the web page is secure by determining whether it is the same URL as the destination or target URL (e.g., the URL associated with the target terminal or target server system) and/or by determining via domain name resolution whether the URL has been tampered with or otherwise affected by malicious software.

In some embodiments, a third security parameter of the one or more security parameters is satisfied (412) when web page information associated with the user interface for the first application is secure. When the information interaction is performed via a web page (e.g., an online payment platform) opened by a browser, device 502/503 (or, more specifically, security verification module 634) determines whether the amount of money to be paid is the same as the amount indicated in the page information (e.g., the HTML code for the web page) and/or determines whether the page information has been tampered with or otherwise affected by malicious software.

In some embodiments, a fourth security parameter of the one or more security parameters is satisfied (414) when an application signature for the first application matches a locally stored application signature for the first application. In some embodiments, the fourth security parameter is satisfied when device 502/503 (or, more specifically, security verification module 634) determines that an application signature (e.g., an SSL certificate) for the first application matches a locally stored/cached application signature for the first application. In some embodiments, the locally stored application signature is a certificate that was stored in the device's local memory when the application was first downloaded or installed.

In accordance with a determination that the one or more security parameters are satisfied (416), the electronic device displays (418) a security keyboard on the display corresponding to a second application different from the first application. After determining that the one or more security parameters are satisfied, device 502/503 (or, more specifically, security keyboard module 636) displays a security keyboard (e.g., a soft keyboard) that enables the user to securely enter their private user information (e.g., credit card information, billing address, shipping address, etc.). In some embodiments, the security keyboard includes security features that protect against interception or eavesdropping of the information entered via the security keyboard. The security keyboard is associated with a second application (e.g., second application 632) different from the first application (e.g., first application 630). In some embodiments, the security keyboard is overlaid on the user interface for the first application or the security keyboard replaces display of the user interface for the first application. In some embodiments, the security keyboard occupies less than all of the display.

In accordance with a determination that the one or more security parameters are satisfied (416), the electronic device receives (420) user information input via the security keyboard by a user of the electronic device. For example, device 502/503 receives one or more finger inputs on the security keyboard corresponding to user information for completing payment or an information interaction process.

In some embodiments, in accordance with a determination that the one or more security parameters are satisfied (416), the electronic device encrypts (422), by the second application, the user information after receiving the user information input via the security keyboard. In some embodiments, the second application (or, more specifically, security keyboard module 636) encrypts the user information after receiving the user information via the security keyboard so as to ward against the interception of such user information by malicious software or other officious intermeddlers.

In some embodiments, the second application is (424) a security application. In some embodiments, the security application (e.g., second application 632) provides an additional layer of security for device 502/503 and, among other things, provides a security keyboard for secured entrance of sensitive user information and encryption of the received user information.

In some embodiments, the electronic device verifies (426) an address associated with the target terminal. In some embodiments, security verification module 634 associated with a security second application (or another security application or device feature different from both the first and second applications) verifies that the address of the target address (e.g., the recipient of the user information) matches a previously stored address for the target terminal. For example, when the first application was first downloaded or installed an address for the target terminal was locally stored on device 502/503. In some embodiments, device 502/503 verifies the address associated with the target terminal after receiving the user information input via the security keyboard. In some other embodiments, device 502/503 verifies the address associated with the target terminal prior to or while receiving the user information input via the security keyboard. When the information interaction is performed via a web page opened by a browser, device 502/503 determines whether the address of the target terminal in the information interaction process matches the domain name thereof determined by way of domain name resolution.

The electronic device transmits (428) the user information to a target terminal. In some embodiments, the target terminal is associated with a server or computer system for the seller or merchant (i.e., the other party in the transaction or information interaction process that is not the user of the device). For example, network communication module 618 connects client device 502/503 to one or more communication networks 504 so as to send the received user information to the target terminal (e.g., server system 510) associated with the seller or merchant to complete the transaction or information interaction process.

In some embodiments, transmitting the user information to the target terminal comprises (430) transmitting the user information to the target terminal when the address associated with the target terminal is verified. In some embodiments, device 502/503 only sends the received user information to the target terminal when the address of the target terminal has been verified.

It should be understood that the particular order in which the operations in FIGS. 4A-4B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the methods in FIGS. 1 and 2) are also applicable in an analogous manner to method 400 described above with respect to FIGS. 4A-4B.

FIG. 5 is a diagram of a client-server environment 500 in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, client-server environment 500 includes a server system 510, one or more mobile phone operators 522, one or more Internet service providers 520, and one or more communication networks 504. Each of server system 510, mobile phone operator 522 (e.g., a wireless carrier), and Internet service providers 520 are capable of being connected to one or more communication networks 504 in order to facilitate the exchange of information with one another and/or other devices and systems.

The exchange of information generates traffic for operators 522 which results in data usage. In some circumstances, the traffic includes messages that include a data usage value (e.g., a report of a user's data usage with a respective operator 520 or 522). Within server system 510, there is a server computer 511 for receiving and processing data received from the client devices 502 and/or 503 (e.g., for analyzing messages containing a data usage value in order to obtain a data usage value template). In some circumstances, a user 501 (e.g., a single user or a family) may have multiple client devices that share a data usage plan. For example, smart-phone 502 and laptop 503 share a mobile carrier plan with the mobile phone operator 522-b as well as an internet plan with the internet service provider 520-a. Within server system 510, there is also a database 512 for storing information (e.g., data usage templates, etc.). Additionally, mobile phone operator 522 and Internet service provider 520 are operable to connect client devices to one or more communication networks 504 as well. For example, smart-phone 502 is operable with the network of mobile phone operator 522-a, which includes for example, a base station 524-a. Similarly, for example, laptop computer 503-a (or tablet, desktop, workstation, or the like) is connectable to the network provided by first internet service provider 520-a, which is ultimately connectable to one or more communication networks 504. Laptop computer 503-b (or tablet, desktop, workstation, or the like), associated with a different user is connectable to the network provided by second internet service provider 520-b, which is ultimately connectable to one or more communication networks 504. Each of these operators (e.g., mobile phone operators 522 and Internet service providers 520), or in some cases a respective subset of the operators, place restrictions on an amount of data that a user may use (e.g., a monthly amount based on a user's data plan).

One or more communication networks 504 is any combination of wired and wireless local area network (LAN) and/or wide area network (WAN), such as an intranet, an extranet, including a portion of the Internet. In some embodiments, one or more communication networks 504 include the Internet, other Wide Area Networks, Local Area Networks, Personal Area Networks, metropolitan area networks, VPNs, local peer-to-peer and/or ad-hoc connections, and so on. It is sufficient that one or more communication networks 504 provide communication capability between client devices 502/503 and server systems 510. In some implementations, one or more communication networks 504 use HyperText Transport Protocol (HTTP) to transport information using the Transmission Control Protocol/Internet Protocol (TCP/IP). HTTP permits a client device to access various resources available via one or more communication networks 504. However, the various implementations described herein are not limited to the use of any particular protocol.

Moreover, those skilled in the art will appreciate from the present disclosure that any number of such devices and/or systems may be provided in client-server environment 500, and particular devices may be altogether absent. In other words, client-server environment 500 is merely an example provided to discuss more pertinent features of the present disclosure.

As discussed below in greater detail with reference to FIG. 6, some client devices, such as smart-phone 502 or laptop 503, include one or more input devices and one or more output devices. Herein, a respective client device 502/503 is sometimes also called a mobile terminal, an electronic device, a user device, or, more simply, a device. In operation, a client device 502/503 interacts with one or more communication networks 504 and one or more hardware elements (e.g., the digital camera) to facilitate the exchange of messages that generate traffic and therefore data usage. For example, a user using smart-phone 502 takes a picture with a digital camera of the smart-phone and send the picture, with accompanying text via one or more communication networks 504 as an instant message to a distinct instant message account, or as an MMS, or as an email, which will count against the user's data plan.

FIG. 6 is a block diagram illustrating a representative client device 502/503 associated with user 501 in accordance with some embodiments. Client device 502/503, typically, includes one or more processing units (CPUs) 602, one or more network interfaces 604, memory 606, and one or more communication buses 608 for interconnecting these components (sometimes called a chipset). Client device 502/503 also includes a user interface 610. User interface 610 includes one or more output devices 612 that enable presentation of media content, including one or more speakers and/or one or more visual displays (e.g., a touch screen display). User interface 610 also includes one or more input devices 614, including user interface components that facilitate user input such as a keyboard, a mouse, a voice-command input unit or microphone, a touch sensitive display (e.g., a touch screen display), a touch-sensitive input pad, a gesture capturing camera, or other input buttons or controls. Furthermore, some client devices 502/503 use a microphone and voice recognition or a camera and gesture recognition to supplement or replace the keyboard. Memory 606 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 606, optionally, includes one or more storage devices remotely located from CPU(s) 602. Memory 606, or alternately the non-volatile memory device(s) within memory 606, includes a non-transitory computer readable storage medium. In some implementations, memory 606, or the non-transitory computer readable storage medium of memory 606, stores the following programs, modules, and data structures, or a subset or superset thereof:

- an operating system 616 including procedures for handling various basic system services and for performing hardware dependent tasks;
- a network communication module 618 for connecting client device 502/503 to other computers (e.g., server systems 510 or a target terminal) via one or more communication network interfaces 604 (wired or wireless) and one or more communication networks 504;
- a presentation module 620 for enabling presentation of a user interface for a web page or an applications program at client device 502/503 via one or more output devices 612 (e.g., displays, speakers, etc.) associated with user interface 610;
- one or more client application modules 622 for enabling client device 502/503 to perform corresponding functions, including but not limited to:
    - an input processing module 624 for detecting one or more user inputs or interactions with one of the one or more input devices 614 and interpreting the detected inputs or interactions; and
    - a request generation module 626 for generating a request for media content, a web page, or an application program in accordance with the inputs or interactions detected by the input processing module 624;
    - a content reception module 628 for receiving content (e.g., information, text, audio and/or video, a web page, or a user interface for an application program) from one or more server systems 510;
    - a first application 630 (e.g., a web browser, payment application, or shopping application) for requesting and accessing media content, web pages, and web-based applications so as to facilitate an information interaction process; and
    - a second application 632 (e.g., a background security application) for securing the information interaction process, the second application including:
        - a security verification module 634 for determining (or verifying) whether one more security parameters are satisfied, and for verifying an address associated with a target terminal of the information interaction process; and
        - a security keyboard module 636 for providing (or initiating) a security keyboard for receiving and encrypting user information associated with the information interaction process; and
- one or more client data modules 638 for storing data related to client device 502/503, including but not limited to:
    - a media content buffer 640 for temporarily storing content received from one or more server systems 510;
    - a media content database 642 for storing received content as part of user 501's personal library of media content; and
    - a user profile 644 for storing context information associated with user 501 of client device 502/503, optionally, including a log of user interactions with a web browser and/or application programs, a log of the user's web browsing history, user preferences, user security settings, and other context information.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7:
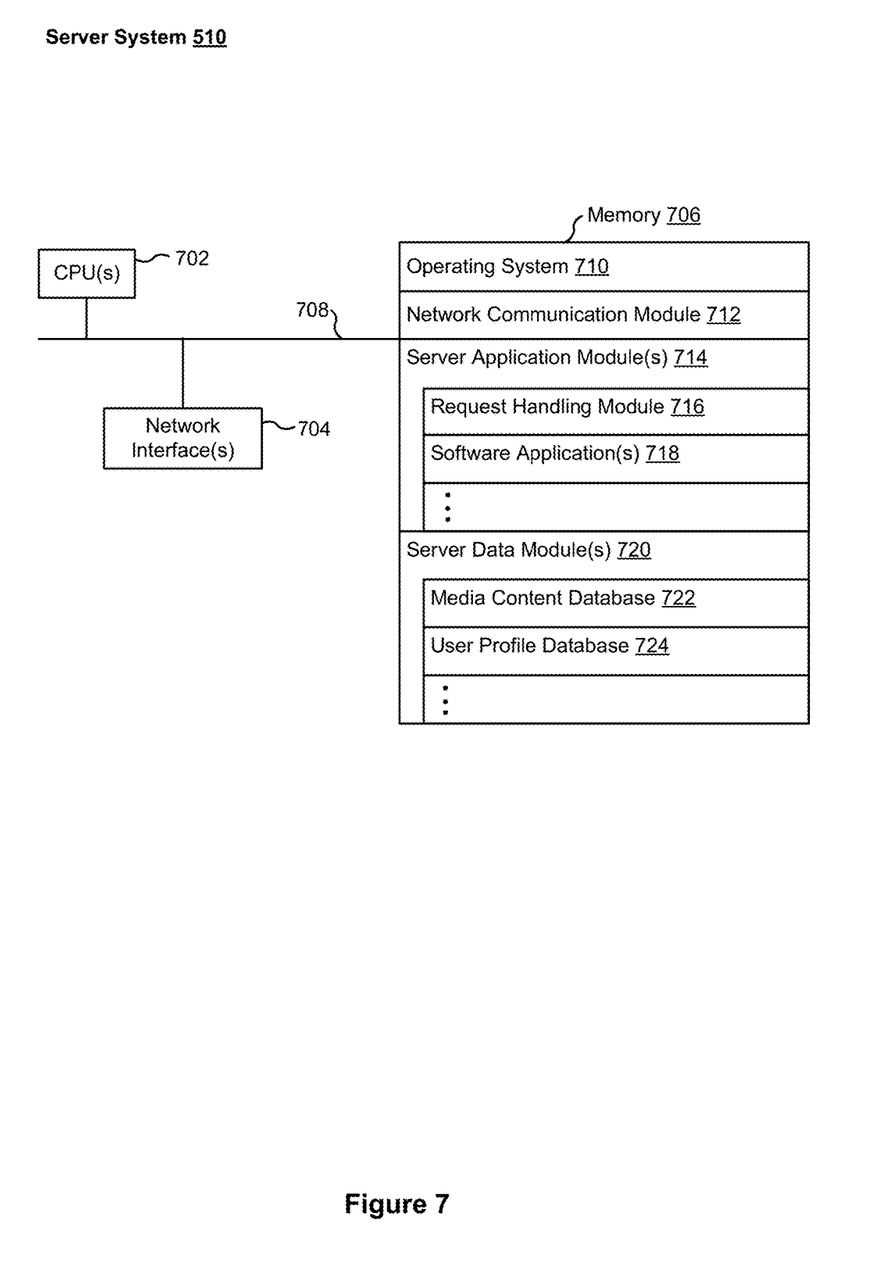
FIG. 7 is a diagram of an example of a server system in accordance with some embodiments.

FIG. 7 is a block diagram illustrating a representative server system 510 (e.g., a target terminal), or, alternatively, server computer 511, in accordance with some embodiments. Server system 510, typically, includes one or more processing units (CPUs) 702, one or more network interfaces 704, memory 706, and one or more communication buses 708 for interconnecting these components (sometimes called a chipset). In some embodiments, memory 706 includes database 512. In some other embodiments, database 512 is located remotely from memory 706 which is located at server computer 511, but database 512 is accessible to server computer 511 and is a component of server system 510. Memory 706 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 706, optionally, includes one or more storage devices remotely located from CPU(s) 702. Memory 706, or alternately the non-volatile memory device(s) within memory 706, includes a non-transitory computer readable storage medium. In some implementations, memory 706, or the non-transitory computer readable storage medium of memory 706, stores the following programs, modules, and data structures, or a subset or superset thereof:

- an operating system 710 including procedures for handling various basic system services and for performing hardware dependent tasks;
- a network communication module 712 that is used for connecting server system 510 to other computers (e.g., client devices 502/503) via one or more network interfaces 704 (wired or wireless) and one or more communication networks 504;
- one or more server application modules 714 for enabling server system 510 to perform corresponding functions, including but not limited to:
  - a request handling module 716 for receiving requests from client devices 502/503, including requests to login to or access services, application programs, or web pages provided by server system 510; and
  - one or more software applications 718 (e.g., web-based application programs or software-as-a-service) enabling a user to utilize corresponding services, functions, tools, or media content; and
- one or more server data modules 720 for storing data related to server system 510, including but not limited to:
  - media content database 722 for storing information (e.g., media content, web pages, etc.) and metadata describing the information; and
  - a user profile database 724 for storing context information for a plurality of users, where the context information for a respective user, optionally, includes a log of the respective user's interactions within the web browser and application programs, a log of the respective user's web browsing history, the respective user's preferences, the respective user's security settings, and other context information.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Although FIG. 7 shows server system 510, FIG. 7 is intended more as functional description of the various features which may be present in a set of servers than as a structural schematic of the implementations described herein. In practice, and as recognized by those of ordinary skill in the art, items shown separately could be combined and some items could be separated. For example, some items shown separately in FIG. 7 could be implemented on a single server and single items could be implemented by one or more servers. The actual number of servers used to implement server system 510 and how features are allocated among them will vary from one implementation to another.

Although the terms first, second, etc. may be used herein to describe various elements, these elements should not be limited by these terms. These terms are only used to distinguish one element from another. For example, a first application could be termed a second application, and, similarly, the second application could be termed the first application, without departing from the scope of the present invention. The first application and the second application are both applications, but they are not the same application.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations.

However, the illustrative discussions above are not intended to be exhaustive or to limit the invention to the precise forms disclosed. Many modifications and variations are possible in view of the above teachings. The embodiments were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of securing an information interaction process, comprising:
    at an electronic device with one or more processors, memory, and a display:
        detecting a user interaction with a specific field displayed in a user interface for a first application;
        in response to detecting the user interaction with the specific field displayed in the user interface for the first application, determining whether a plurality of security parameters is satisfied, the plurality of security parameters including a first security parameter corresponding to a network access point being used by the electronic device, a second security parameter corresponding to a Uniform Resource Locator (URL) associated with the user interface for the first application, and a third security parameter corresponding to web page information associated with the user interface for the first application;
        in accordance with a determination that the plurality of security parameters is satisfied, including that the network access point being used by the electronic device satisfies predefined criteria, the URL associated with the user interface for the first application matches a target URL associated with the target terminal, and the web page information associated with the user interface for the first application matches information displayed on the user interface for the first application, including the user information input into the specific field:
            launching a keyboard application, distinct from the first application, to display a keyboard on the display, wherein the keyboard application encrypts user information input via the keyboard;
            after displaying the keyboard of the keyboard application on the display, receiving user information input via the keyboard by a user of the electronic device, wherein the user information is input into the specific field displayed in the user interface for the first application;
            encrypting, by the keyboard application, the user information received via the keyboard; and
            transmitting the encrypted user information to a target terminal.

2. The method of claim 1, wherein:
    a fourth security parameter of the plurality of security parameters corresponds to an application signature for the first application; and
    determining whether the plurality of security parameters is satisfied further comprises determining that the application signature for the first application matches a locally stored application signature for the first application.

3. The method of claim 1, further comprising, verifying an address associated with the target terminal; and
    transmitting the encrypted user information to the target terminal comprises transmitting the encrypted user information to the target terminal after the address associated with the target terminal is verified.

4. The method of claim 1, wherein:
    the first application is a payment application;
    the user interface for the first application corresponds to an information interaction process; and
    the keyboard application is a security application.

5. An electronic device, comprising:
    one or more processors; and
    memory;
    a display; and
    one or more programs, wherein the one or more programs are stored in the memory and configured to be executed by the one or more processors, the one or more programs including instructions that when executed by the one or more processors cause the electronic device to:
        detect a user interaction with a specific field displayed in a user interface for a first application;
        in response to detecting the user interaction with the specific field displayed in the user interface for the first application, determine whether a plurality of security parameters is satisfied, the plurality of security parameters including a first security parameter corresponding to a network access point being used by the electronic device, a second security parameter corresponding to a Uniform Resource Locator (URL) associated with the user interface for the first application, and a third security parameter corresponding to web page information associated with the user interface for the first application;
        in accordance with a determination that the plurality of security parameters is satisfied, including that the network access point being used by the electronic device satisfies predefined criteria, the URL associated with the user interface for the first application matches a target URL associated with the target terminal, and the web page information associated with the user interface for the first application matches information displayed on the user interface for the first application, including the user information input into the specific field:
            launch a keyboard application, distinct from the first application, to display a keyboard on the display, wherein the keyboard application encrypts user information input via the keyboard;
            after displaying the keyboard of the keyboard application on the display, receive user information input via the keyboard by a user of the electronic device, wherein the user information is input into the specific field displayed in the user interface for the first application;
            encrypt, by the keyboard application, the user information received via the keyboard; and
            transmit the encrypted user information to a target terminal.

6. The electronic device of claim 5, wherein:
a fourth security parameter of the plurality of security parameters corresponds to an application signature for the first application; and
determining whether the plurality of security parameters is satisfied further comprises determining that the application signature for the first application matches a locally stored application signature for the first application.

7. The electronic device of claim 5, wherein the instructions further cause the electronic device to verify an address associated with the target terminal; and
transmitting the encrypted user information to the target terminal comprises transmitting the encrypted user information to the target terminal after the address associated with the target terminal is verified.

8. The electronic device of claim 5, wherein:
the first application is a payment application;
the user interface for the first application corresponds to an information interaction process; and
the keyboard application is a security application.

9. A non-transitory computer readable storage medium storing one or more programs, the one or more programs comprising instructions, which when executed by an electronic device with one or more processors, memory, and a display, cause the electronic device to:
detect a user interaction with a specific field displayed in a user interface for a first application;
in response to detecting the user interaction with the specific field displayed in the user interface for the first application, determine whether a plurality of security parameters is satisfied, the plurality of security parameters including a first security parameter corresponding to a network access point being used by the electronic device, a second security parameter corresponding to a Uniform Resource Locator (URL) associated with the user interface for the first application, and a third security parameter corresponding to web page information associated with the user interface for the first application;
in accordance with a determination that the plurality of security parameters is satisfied, including that the network access point being used by the electronic device satisfies predefined criteria, the URL associated with the user interface for the first application matches a target URL associated with the target terminal, and the web page information associated with the user interface for the first application matches information displayed on the user interface for the first application, including the user information input into the specific field:
launch a keyboard application, distinct from the first application, to display a keyboard on the display, wherein the keyboard application encrypts user information input via the keyboard;
after displaying the keyboard of the keyboard application on the display, receive user information input via the keyboard by a user of the electronic device, wherein the user information is input into the specific field displayed in the user interface for the first application;
encrypt, by the keyboard application, the user information received via the keyboard; and
transmit the encrypted user information to a target terminal.

10. The non-transitory computer readable storage medium of claim 9, wherein:
a fourth security parameter of the plurality of security parameters corresponds to an application signature for the first application; and
determining whether the plurality of security parameters is satisfied further comprises determining that the application signature for the first application matches a locally stored application signature for the first application.

11. The non-transitory computer readable storage medium of claim 9, wherein the instructions further cause the electronic device to verify an address associated with the target terminal; and
transmitting the encrypted user information to the target terminal comprises transmitting the encrypted user information to the target terminal after the address associated with the target terminal is verified.

* * * * *